United States Patent Office 2,902,452
Patented Sept. 1, 1959

2,902,452

AQUEOUS GLYCOL INHIBITED AGAINST FOAMING

Rudolph J. Holzinger, North Merrick, N.Y., assignor to Socony-Vacuum Oil Company, Incorporated, a corporation of New York No Drawing. Application October 26, 1954
Serial No. 464,896

9 Claims. (Cl. 252—73)

This invention has to do with glycol compositions inhibited against the formation of foam, and also has to do with a method for preventing, reducing or inhibiting foaming in glycol systems.

The formation of foam or foaming is a nuisance in many industrial operations. Particularly is this so since foam takes up space normally occupied by the composition initially assigned to that space. For example, foaming of anti-freeze compositions in cooling systems for internal combustion engines, seriously reduces the efficiency of the anti-freeze action.

Numerous anti-foaming agents have been prepared to counter this industrial nuisance, and some have been used commercially. Among the conventional anti-foaming agents are high molecular weight alcohols and esters. Decanol and tributyl citrate, respectively, are examples of such commercial defoamants. Other materials, insoluble in ethylene glycol, have been used to eliminate or to retard the formation of foam in cooling systems. For instance, kerosine has been added in small quantities to the anti-freeze in automotive cooling systems. However, the use of such anti-foamants is unreliable because of the difficulty in proportioning the anti-foamants.

In general, the efficiency of available commercial defoamants has not been considered satisfactory. This invention is directed to the discovery of outstanding anti-foaming characteristics of a new class of defoamants, particularly useful for use with glycols. The new class of defoamants contemplated herein is comprised of organic ethers.

It is an object of this invention, therefore, to provide a glycol composition resistant to the formation of foam in the presence of water. It is also an object of this invention to provide a glycol composition containing a substantial proportion of water and yet resistant to foam formation. Another object of this invention is the provision of a method for defoaming aqueous glycol solutions. Another object is to provide a one phase system. Another object is to provide a composition characterized by low volatility. Another object is to provide a composition substantially free from odor. Another object is the provision of a composition free from hydrolysis by alkali. Another object is the provision of a glycol composition having a long term protection against foam formation. Still another object is to provide a method for inhibiting foaming of glycol coolants circulated through cooling systems of internal combustion engines. Other objects of the invention will be apparent from the following descriptive material.

The foregoing objects are realized by the use of an aliphatic ether having from about 11 to about 18 carbon atoms per molecule. Preference is accorded, however, to such ethers having from about 12 to about 16 carbon atoms per molecule. Typical ethers contemplated herein are dihexyl ether, dioctyl ether, dinonyl ether, hexyl-decyl ether and, of these, dihexyl and dioctyl are particularly preferred.

The glycols of this invention, which are normally prone to foam in the presence of water, are water-soluble glycols. Typical of such glycols are ethylene, diethylene and higher ethylene homologs, propylene, dipropylene and higher propylene homologs.

It has been determined that the organic ether defoamants are effective in concentrations ranging from about 0.01% to about 3%, by volume of the glycol with which they are associated. It is preferred, however, to use the ether in proportions ranging from about 0.05 to about 0.25%. It has been found that when an ether is used in a concentration below about 0.01%, that relatively little foam inhibition is achieved. In the same vein it has been found that when the ether is present in a concentration above about 3%, there is a sacrifice in freezing point protection without any further gain in the protection period.

The ether defoamants, in the concentrations recited above, can be added to a glycol as sold to the trade. Then, too, a composition comprising the glycol and the ether in said concentrations, can be prepared and sold as such. The ether defoamants can be added to a mixture of glycol and water, although the last-named procedure is less advantageous.

The anti-foaming agents of this invention have been evaluated along with commercial anti-foamants, in the following performance test used in the industry. The performance test is a modification of ASTM D-892-46T "Foaming Characteristics of Crankcase Oils." The performance test is based upon a determination of the volume of foam formed over a measured amount of anti-freeze solution, aerated under prescribed conditions for five minutes. The least formation of foam is an indication of the best anti-foam. Anti-freeze under test, a quantity of 75 milliliters (mls.), is diluted with distilled water to a total volume of 300 mls. The resulting solution is heated to 180° F. and is then transferred to a 1,000 mls. graduated cylinder, the latter being held in a constant temperature bath maintained at 180° F. A diffuser stone, connected by glass tubing to a compressed air line, is inserted into the solution under test so as to be positioned in the center of the cylinder and just above the bottom of the cylinder. Flow of air is started before insertion of the stone and is maintained at a rate of 2000 mls. per minute. Foam volume is determined after 5 minutes of aeration. Results of these tests are set out in Table I given below:

Table I

| Anti-foam Agent | Conc., Percent By Volume | Volume of Foam, (ml.) |
|---|---|---|
| Decanol | | 560 |
| | 0.05 | 210 |
| Do | 0.5 | 240 |
| Tributyl Citrate | 0.05 | 140 |
| Do | 0.5 | 340 |
| Diamyl Ether | 0.5 | 560 |
| Do | 0.05 | 560 |
| Dihexyl Ether | 0.5 | 50 |
| Do | 0.05 | 40 |
| Dioctyl Ether | 0.5 | 10 |
| Do | 0.05 | 30 |

A number of conclusions can be drawn from the results shown above. Commercial defoamants, specifically decanol and tributyl citrate, are responsible for a large reduction of the foam characterizing the control of aqueous ethylene glycol. In each instance, however, a concentration of 0.05% is more effective than a concentration of 0.5% for the commercial defoamants. The ether defoamants contemplated herein, illustrated by dihexyl ether and dioctyl ether, are much more effective than either of the aforementioned commercial defoamants. For example, a concentration of 0.05% of dihexyl ether, reduces the foam volume from 560 mls. to 50 mls.; whereas, a like concentration of decanol reduced the foam volume to only 210 mls., and a like volume of tributyl citrate reduced the foam volume to only 140 mls. When the concentration of dihexyl ether is increased to 0.5%, from 0.05%, the foam volume is reduced to only 40 mls. Dioctyl ether, when used in a concentration of 0.05%, substantially negates foam formation, inasmuch as only 10 mls. of foam is formed.

In contrast to the advantageous inhibition achieved with the ethers contemplated herein, other ethers are either ineffective or substantially ineffective as defoamants. This is illustrated by the results obtained with diamyl ether.

As contemplated herein the ethers used in conjunction with the above-recited glycol system, are advantageous in providing an effective method for defoaming aqueous glycol systems. Similarly, the ethers of this invention aid in the provision of a method for inhibiting foaming of an aqueous glycol coolant circulating through the cooling systems of an internal combustion engine. In such a method, the ether in a suitable concentration is incorporated in the aqueous glycol solution and the resulting solution is circulated through the said cooling system.

It is to be noted that conventional corrosion inhibitors, dyes and other additives used in glycol systems, such as glycol anti-freeze compositions, can be used in the compositions of this invention. The ethers do not adversely affect such materials, nor are they adversely affected by such materials. Representative of such coolant inhibitors are borax, sodium nitrite and dipotassium phosphate; representative of such dyes, which are used primarily for brand identification, is Patent Blue (empirical formula, $C_{37}H_{35}N_2O_6S_2N_a$). One typical formulation, for example, calls for 0.003 percent by weight of Patent Blue.

It is also to be understood that the invention is not to be limited to anti-freeze compositions for automotive cooling systems or to a method for defoaming such systems, but is particularly applicable to anti-freeze compositions for any internal combustion cooling systems and to a method for defoaming the latter. Typical of other such systems are: aircraft cooling systems, marine cooling systems and stationary diesels. Water base hydraulic fluids are also included within the scope of the invention.

I claim:

1. A composition of matter consisting essentially of: ethylene glycol in admixture with from about 0.01 percent to about 3 percent, by volume, of a saturated aliphatic ether having from about eleven to about eighteen carbon atoms per molecule and having as its sole oxygen atom an ether oxygen atom.

2. A composition of matter consisting essentially of: ethylene glycol in admixture with from about 0.05 percent to about 0.25 percent, by volume, of a saturated aliphatic ether having from about twelve to about sixteen carbon atoms per molecule and having as its sole oxygen atom an ether oxygen atom.

3. A composition of matter consisting essentially of: ethylene glycol in admixture with from about 0.01 percent to about 3 percent, by volume, of dihexyl monoether.

4. A composition of matter consisting essentially of: ethylene glycol in admixture with from about 0.01 percent to about 3 percent, by volume, of dioctyl monoether.

5. A composition of matter consisting essentially of: from about 10 to about 50 parts by volume of ethylene glycol, from about 0.001 to about 1.5 parts by volume of a saturated aliphatic ether having from about eleven to about eighteen carbon atoms per molecule and having as its sole oxygen atom an ether oxygen atom, and the balance to make 100 parts by volume, of water.

6. A composition of matter consisting essentially of: from about 10 to about 50 parts by volume of ethylene glycol, and from about 0.001 to about 1.5 parts by volume of dihexyl monoether, and the balance, to make one hundred parts by volume, of water.

7. A composition of matter consisting essentially of: from about 10 to about 50 parts by volume of ethylene glycol, and from about 0.001 to about 1.5 parts by volume of dioctyl monoether, and the balance, to make one hundred parts by volume, of water.

8. The method of defoaming aqueous ethylene glycol which comprises: incorporating in said aqueous ethylene glycol from about 0.01 percent to about 3 percent by volume, based upon the ethylene glycol content of said aqueous material, of a saturated aliphatic ether having from about eleven to about eighteen carbon atoms per molecule and having as its sole oxygen atom an ether oxygen atom.

9. The method of inhibiting foaming of the coolant circulating through the cooling system of an internal combustion engine, wherein an aqueous ethylene glycol is so circulated, which comprises: incorporating in said aqueous ethylene glycol from about 0.01 percent to about 3 percent by volume, based upon the ethylene glycol content of said aqueous coolant, of a saturated aliphatic ether having from about eleven to about eighteen carbon atoms per molecule and having as its sole oxygen atom an ether oxygen atom.

References Cited in the file of this patent

UNITED STATES PATENTS

| 2,442,768 | Gunderson | June 8, 1948 |
| 2,695,892 | Jaccard et al. | Nov. 30, 1954 |
| 2,755,251 | Barker | July 17, 1956 |

FOREIGN PATENTS

| 592,214 | Great Britain | Sept. 11, 1947 |
| 684,032 | Great Britain | Dec. 10, 1952 |

OTHER REFERENCES

Ind. and Eng. Chem., vol. 36 of 1944, pp. 570–573.

UNITED STATES PATENT OFFICE

CERTIFICATE OF CORRECTION

Patent No. 2,902,452                            September 1, 1959

Rudolph J. Holzinger

It is hereby certified that error appears in the above numbered patent requiring correction and that the said Letters Patent should read as corrected below.

In the grant, lines 2 and 12, and in the heading to the printed specification, name of assignee, for "Socony-Vacuum Oil Company, Incorporated,", each occurrence, read -- Socony Mobil Oil Company, Inc. --.

Signed and sealed this 29th day of March 1960.

(SEAL)
Attest:

KARL H. AXLINE                                       ROBERT C. WATSON
Attesting Officer                                   Commissioner of Patents